United States Patent [19]
Imahashi

[11] Patent Number: 5,814,961
[45] Date of Patent: Sep. 29, 1998

[54] GUIDANCE SYSTEM FOR AUTOMATED GUIDED VEHICLE

[75] Inventor: Eiichi Imahashi, Yamaguchi, Japan

[73] Assignee: NEC Corporation, Tokyo, Japan

[21] Appl. No.: 922,665

[22] Filed: Sep. 3, 1997

[30] Foreign Application Priority Data

Sep. 3, 1996 [JP] Japan .................................. 8-233436

[51] Int. Cl.⁶ ...................................................... G05D 1/02
[52] U.S. Cl. ........................................... 318/587; 180/168
[58] Field of Search .................................... 318/580, 587; 180/167, 168, 169

[56] References Cited

U.S. PATENT DOCUMENTS 4,089,269  5/1978  Shaw .
4,714,124  12/1987  Laib .

FOREIGN PATENT DOCUMENTS 63-280312  3/1989  Japan .
2-278406   2/1991  Japan .

Primary Examiner—Bentsu Ro
Attorney, Agent, or Firm—Helfgott & Karas, P.C.

[57] ABSTRACT

A guidance system for an automated guided vehicle which moves on a floor surface, comprises a running line composed of grooves of a predetermined length formed in the floor surface and arranged in a lengthwise direction to form a single array, and an operation control code composed of a combination of a plurality of grooves selected from groups having different lengths formed in the floor surface on the running line or in the proximity of the running line. The automated guided vehicle comprises a sensor detecting the grooves for outputting a detection signal, a running line discriminator receiving the detection signal for discriminating the running line to generate a running line discriminating signal, an operation control code discriminator receiving the detection signal for discriminating the operation control code to generate an operation control code signal, and a drive controller receiving the running line discriminating signal and the operation control code signal for driving and controlling the automated guided vehicle.

6 Claims, 6 Drawing Sheets

GUIDANCE SYSTEM FOR AUTOMATED GUIDED VEHICLE

BACKGROUND OF THE INVENTION

1. Field of the Invention

The present invention relates to a guidance system for an automated guided vehicle, and more specifically to a guidance system for guiding an automated guided vehicle along a running line provided on a floor surface, and further for controlling an operation such as a acceleration, deceleration and stop, of the automated guided vehicle, by reading an operation control code provided on the floor surface.

2. Description of Related Art

Figure 1A:
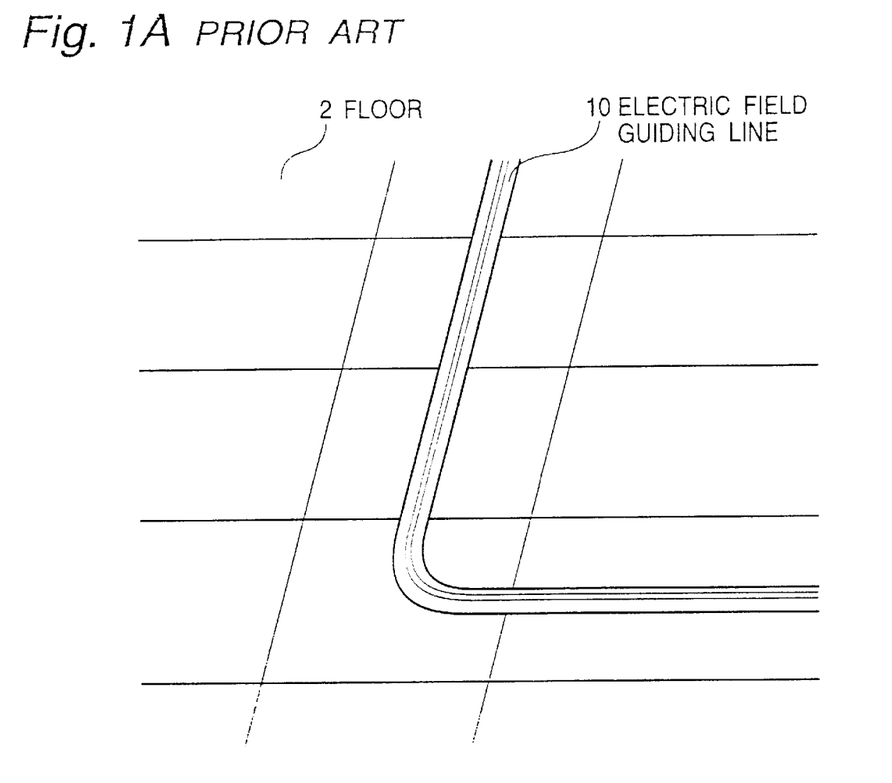
FIG. 1A is a diagrammatic perspective view of a guiding line formed on a floor surface, in a first prior art guidance system for an automated guided vehicle.
Figure 1B:
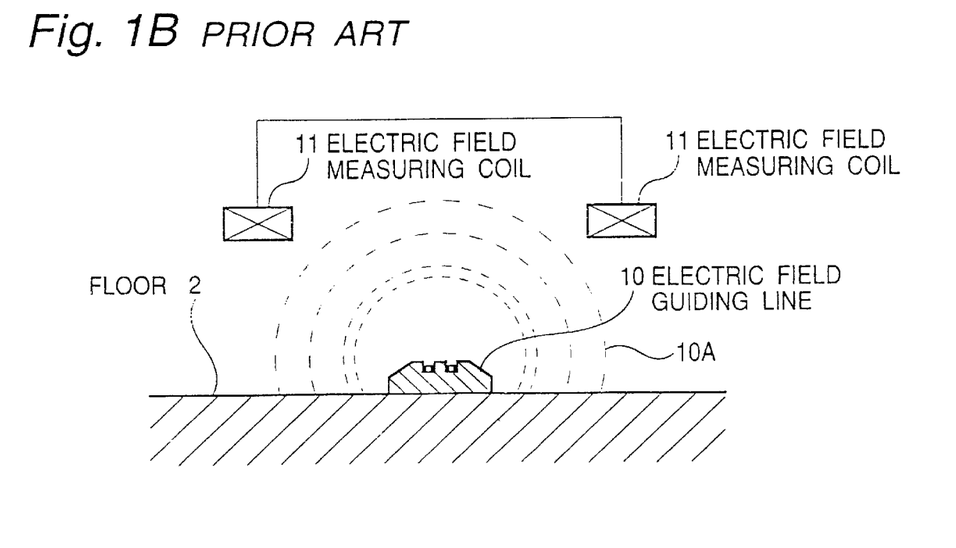
FIG. 1B is a diagrammatic sectional view of the guiding line formed on the floor surface, in the first prior art guidance system for an automated guided vehicle, for illustrating how to detect the guiding line.
Figure 2A:
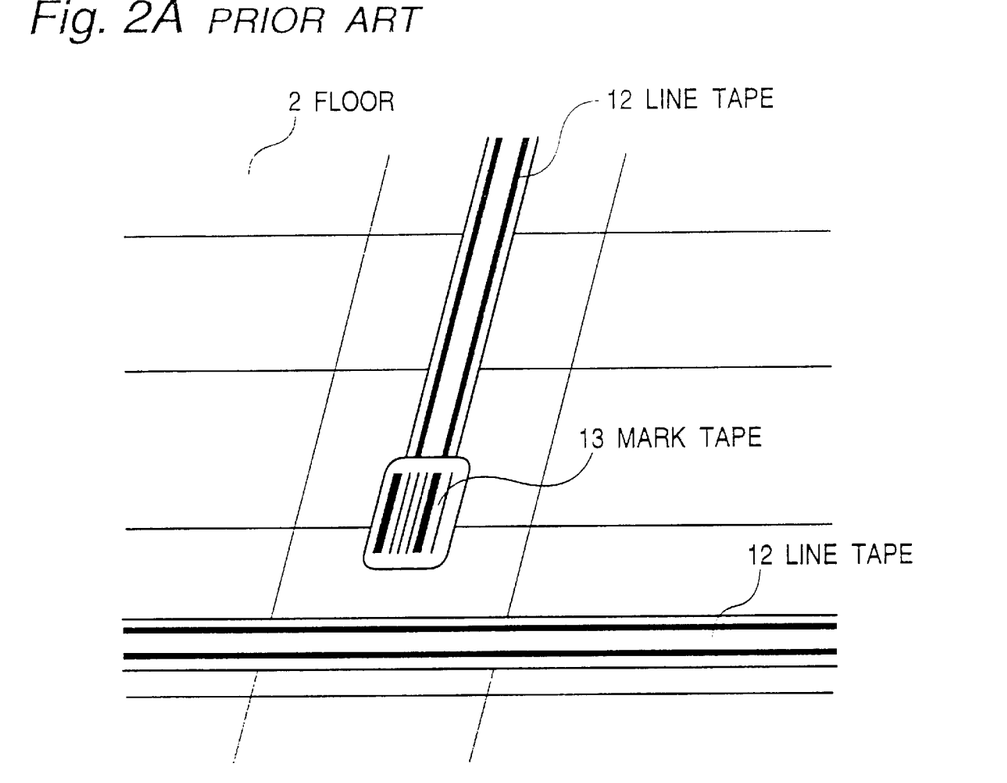
FIG. 2A is a diagrammatic perspective view of a guiding line tape and a control mark tape stuck on a floor surface, in a second prior art guidance system for an automated guided vehicle.
Figure 2B:
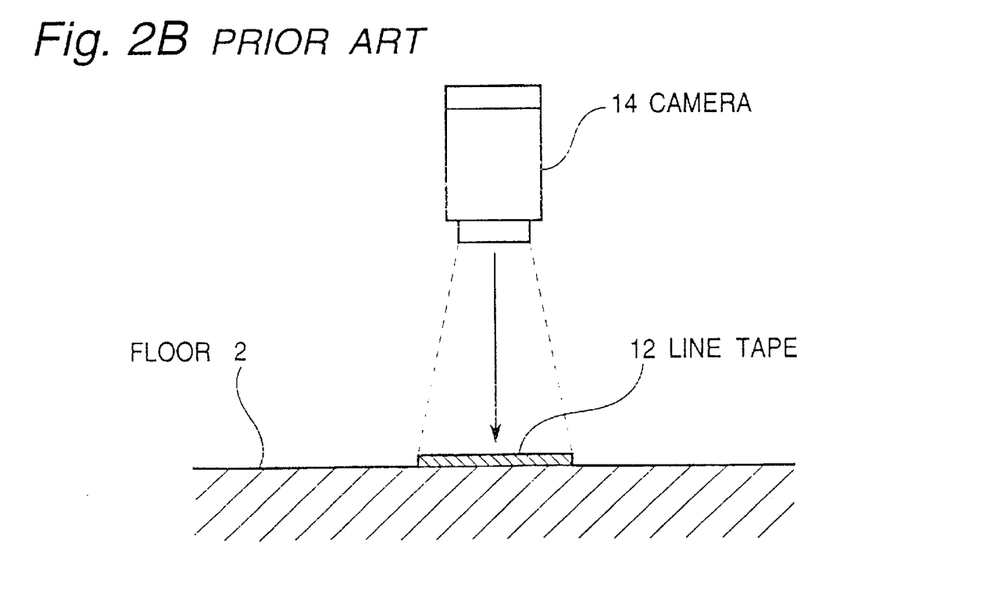
FIG. 2B is a diagrammatic sectional view of the tape stuck on the floor surface, in the second prior art guidance system for an automated guided vehicle, for illustrating how to detect the tape.

In the prior art guidance system for automated guided vehicle, an electric field guiding system and an optical guiding system are well known. In the electric field guiding system, as shown in FIGS. 1A and 1B, an electric field guiding line 10 constituting a running line, is provided on a floor surface on which an automated guided vehicle runs, and an electric field 10A generated by the electric field guiding line 10 is detected by a pair of electric field measuring coils 11 mounted on the automated guided vehicle. On the other hand, in the optical guiding system, as shown in FIGS. 2A and 2B, a line tape 13 having a lengthwise stripe pattern constituting a running line and a control mark tape 13 recording thereon a control code in the form of a bar code, are stuck on a floor surface 2, and these tapes 13 are read out by a camera 14 mounted on a automated guided vehicle.

However, since the above mentioned two types of guidance system require either to mount the electric field guiding line on the floor surface or to stick the optical guiding tape on the floor surface, a convex is generated on the floor surface. Therefore, because a human being, a human-driven carrier, and the automated guided vehicle itself travel on the guiding line or tape, the electric field guiding line is broken out or short-circuited, or the optical guiding tape is damaged, or becomes dirty, or is peeled off. As a result, a trouble occurs in the running of the automated guided vehicle, and ultimately, a running plan of an overall system is hindered.

On the other hand, Japanese Patent Application Pre-examination Publication No. JP-A-02-278406, (an English abstract of JP-A-02-278406 is available from the Japanese Patent Office, and the content of the English abstract of JP-A-02-278406 is incorporated by reference in its entirety into this application), discloses to form a number of small grooves cut, along a guiding line, on a floor surface on which an automated guided vehicle runs, to lay in each small groove an iron piece or pieces which constitute an operation mark, and to detect the operation mark by a proximity sensor mounted on the automated guided vehicle, so that the position of the automated guided vehicle is recognized. In addition, by changing the number of buried pieces, a plurality of operation instructions can be discriminated from each other, so that the operation of the automated guided vehicle is controlled.

In this case, since the operation mark is buried under the floor surface without projecting from the floor surface, the operation mark is never subjected to a shock or a damage from a bottom of the human-driven carrier and the automated guided vehicle. Therefore, durability and reliability are excellent, so that it is possible to reduce the problem in the operation of the automated guided vehicle.

However, the guiding line is used only for guiding the traveling of the automated guided vehicle, and on the other hand, the operation mark is used only for the operation control, giving the instruction such as deceleration, acceleration and stop of the automated guided vehicle, and discriminating the position of the automated guided vehicle. Therefore, the operation mark for discriminating the operation control instruction and the sensor for sensing the operation mark are required in addition to the guiding line for the running guidance and the detector for detecting the guiding line. As a result, the system for controlling the automated guided vehicle was complicated.

SUMMARY OF THE INVENTION

Accordingly, it is an object of the present invention to provide a guidance system for automated guided vehicle, which has overcome the above mentioned defect of the conventional ones.

Another object of the present invention is to provide a guidance system for automated guided vehicle, capable of minimizing the trouble in the running of an automated guided vehicle, to elevate reliability of an automated guided vehicle system.

Still another object of the present invention is to provide a guidance system for automated guided vehicle, in which the running guiding system and the discriminating system for the operation control are unified or consolidated thereby to simplify the instrument construction.

The above and other objects of the present invention are achieved in accordance with the present invention by a guidance system for an automated guided vehicle which moves on a floor surface, comprising:

a running line composed of grooves of a predetermined length which are formed in the floor surface and which are arranged in a lengthwise direction to form a single array;

an operation control code composed of a combination of a plurality of grooves selected from groups having different lengths formed in the floor surface on the running line or in the proximity of the running line;

the automated guided vehicle comprising a sensor detecting the grooves for outputting a detection signal, a running line discriminating means receiving the detection signal for discriminating the running line to generate a running line discriminating signal, an operation control code discriminating means receiving the detection signal for discriminating the operation control code to generate an operation control code signal, and a drive control means receiving the running line discriminating signal and the operation control code signal for driving and controlling the automated guided vehicle.

Specifically, the operation control code discriminating means recognizes the length of each detected groove on the basis of a running velocity of the automated guided vehicle and a duration of the detection signal, and discriminates the operation control code on the basis of the arrangement order of the grooves having different lengths.

In one embodiment, the sensor is constituted of a ultrasonic sensor for detecting the groove by use of a ultrasonic wave. In another embodiment, the sensor is constituted of an optical sensor for detecting the groove by use of a light.

The above and other objects, features and advantages of the present invention will be apparent from the following description of preferred embodiments of the invention with reference to the accompanying drawings.

DESCRIPTION OF THE PREFERRED EMBODIMENTS

Now, an embodiment of the automated guided vehicle guidance system in accordance with the present invention will be described with reference to the accompanying drawings.

Figure 3A:
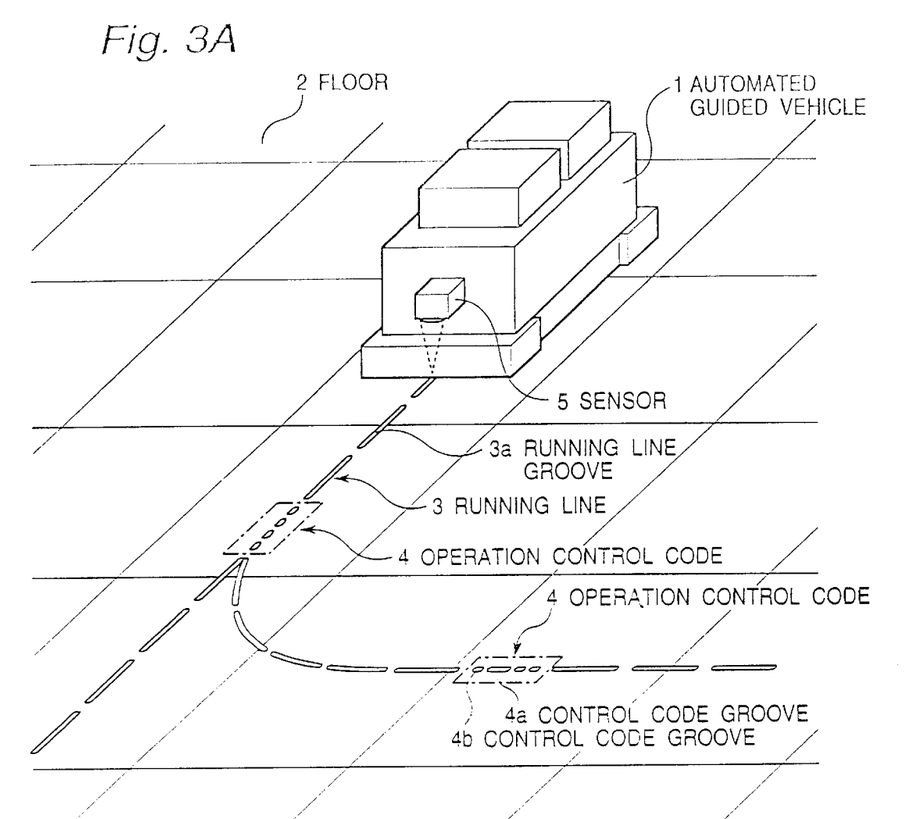
FIG. 3A is a diagrammatic perspective view of an embodiment of the automated guided vehicle guidance system in accordance with the present invention.

Referring to FIG. 3A, there is shown a diagrammatic perspective view of the embodiment of the automated guided vehicle guidance system in accordance with the present invention.

Figure 4A:
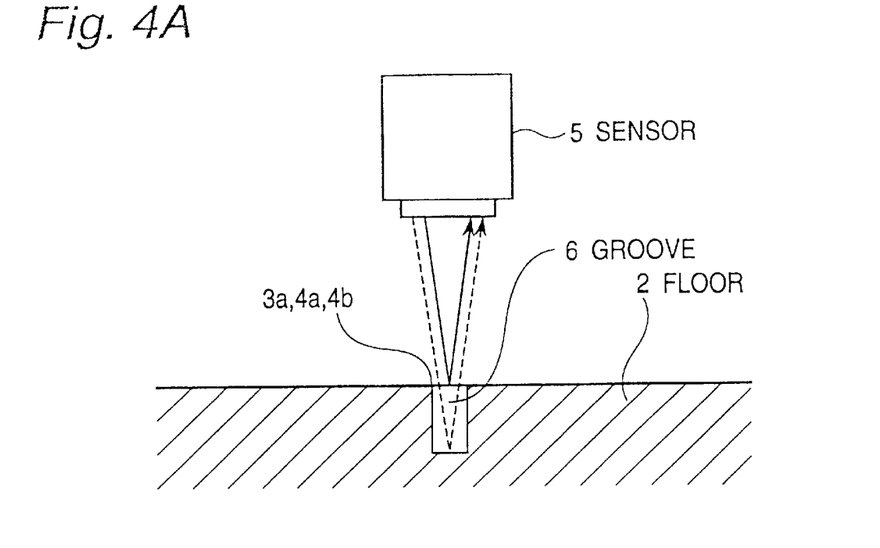
FIG. 4A is a diagrammatic sectional view of the floor having a groove having a bottom, for illustrating how to detect the groove having the bottom.
Figure 4B:
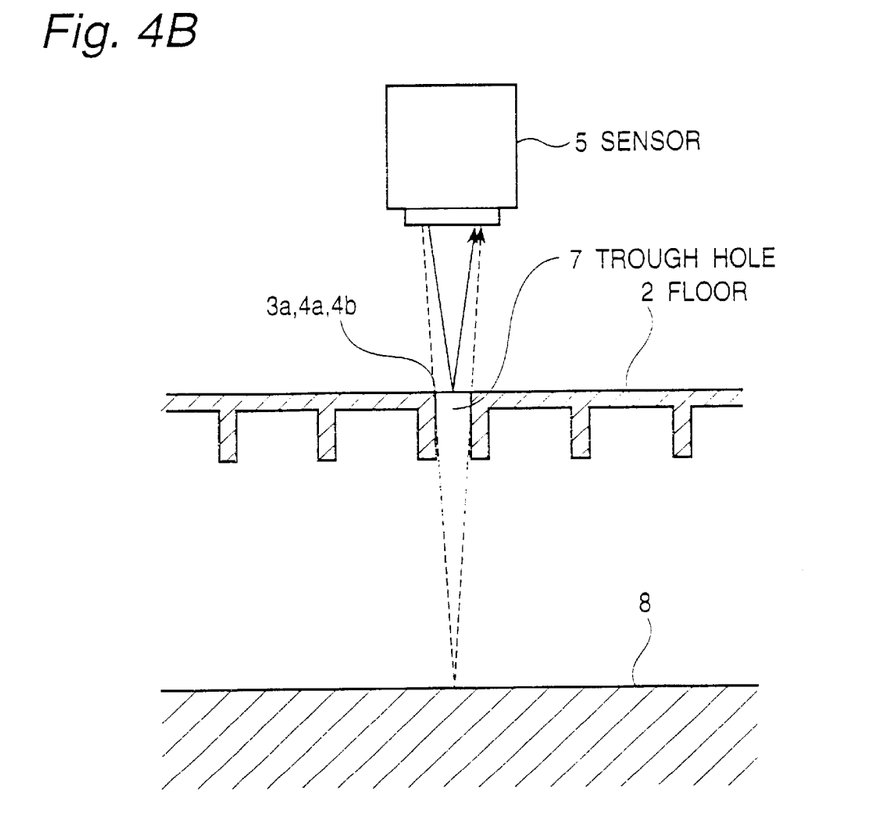
FIG. 4B is a diagrammatic sectional view of the floor having a bottomless groove, for illustrating how to detect the bottomless groove.

As shown in FIG. 3A, in the automated guided vehicle guidance system in accordance with the present invention, a running line 3 for guiding an automated guided vehicle 1 is constituted of a number of elongated grooves 3a having a predetermined constant length, which are arranged with a constant spacing to form a single array extending in a lengthwise direction and which are formed in a floor surface 2 on which the automated guided vehicle 1 runs. The grooves 3a can be constituted of a groove 6 having a bottom form in the floor 2 as shown in FIG. 4A, or alternatively can be constituted of a bottomless groove or through-hole 7 formed to penetrate through a floor plate 2 as shown in FIG. 4B. In any case, as shown in FIGS. 4A and 4B, the grooves 6 and 7 have no portion which is higher than a level of the floor surface 2.

Furthermore, the automated guided vehicle guidance system in accordance with the present invention includes an operation control code 4 composed of a combination of a predetermined number of grooves 4a and/or 4b having different lengths which are located at suitable position in the way of the running line 3 and which are formed in the floor surface 2. Similarly, these grooves 4a and 4b can be constituted of the groove 6 having the bottom as shown in FIG. 4A, or alternatively can be constituted of the bottomless groove or through-hole 7 as shown in FIG. 4B.

Figure 5A:
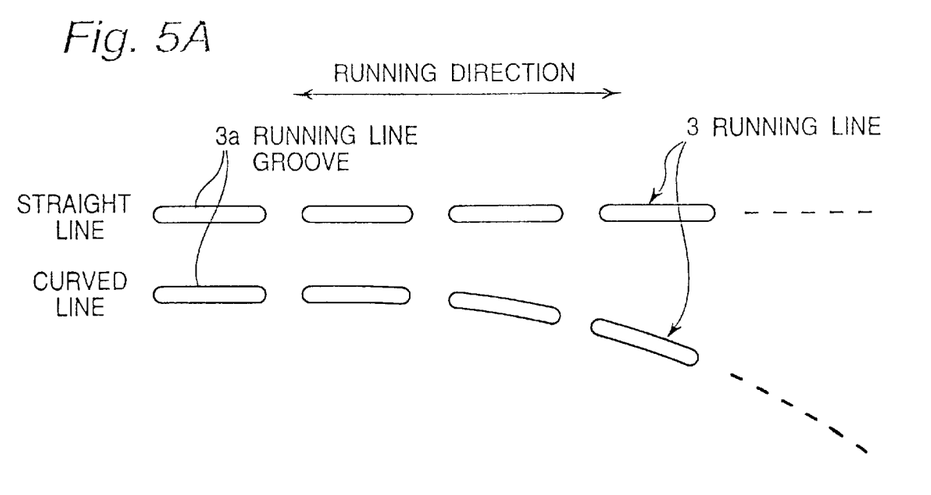
FIG. 5A illustrates an example of the grooves constituting the running line in the automated guided vehicle guidance system in accordance with the present invention.

For example, each of the grooves 3a for the guiding line 3 has a width of 8 mm and a length of 100 mm. The grooves 3a are arranged with constant spacing and at constant intervals to form a single array extending in a lengthwise direction of the groove 3a. As shown in FIG. 5A, when a straight running line is to be constituted, the grooves 3a themselves are formed in a straight form, and are arranged to form a single straight array. When a curved running line is to be constituted, the grooves 3a themselves are formed in a curved form, and are arranged to form a single curved array.

On the other hand, the grooves 4a and 4b constituting the operation control code 4 include for example two kinds of groove having different lengths. A long groove 4a has a width of 8 mm and a length of 60 mm, and a short groove 4b has a width of 8 mm and a length of 8 mm. In this case, namely, the short groove 4b is substantially in the form of a circle in a plan view. In the shown example, furthermore, each of the grooves 3a, 4a and 4b has a length different from the others.

Figure 5B:
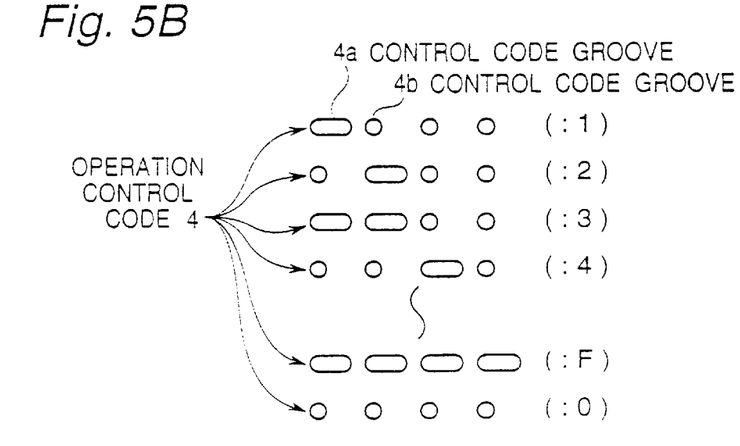
FIG. 5B illustrates an example of the grooves constituting the operation control code in the automated guided vehicle guidance system in accordance with the present invention.

Furthermore, in the shown example, the operation control code 4 is constituted of a combination of four grooves 4a and/or 4b, as shown in FIG. 5B. Therefore, 16 different codes can be expressed by the combination of four grooves 4a and/or 4b, for example by considering that the long groove 4a expresses the binary notation "1" and the short groove 4b expresses the binary notation "0". In FIG. 5B, the parenthesized number indicates a hexadecimal notation. For example, the hexadecimal notation "1" is expressed by the combination of one long groove 4a and three short grooves 4b arranged the named order. The hexadecimal notation "F" (=15 in the decimal notation) is expressed by the combination of only four long groove 4a, and the hexadecimal notation "0" is expressed by the combination of only four short grooves 4b.

Figure 5C:
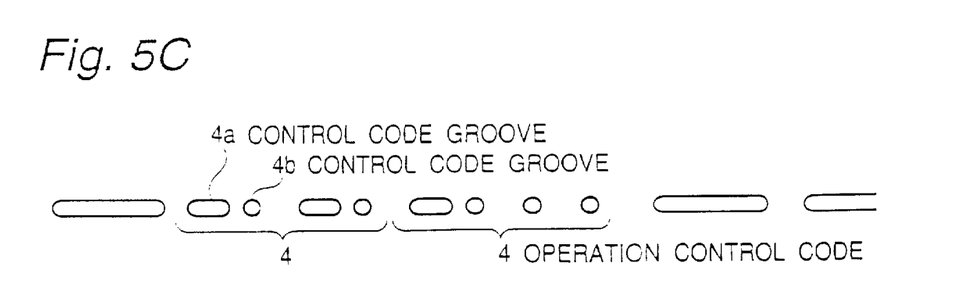
FIG. 5C illustrates an example of a combination of the grooves constituting the running line and the grooves constituting the operation control code, in the automated guided vehicle guidance system in accordance with the present invention.

Furthermore, by combining two operation control codes 4 as shown in FIG. 5C, it is possible to express 256 different codes.

Different codes expressed by different combinations of four grooves 4a and/or 4b, can be used for different purposes, for example, as a code indicating an address on a running route along which the automated guided vehicle runs, or a code indicating a stop, a deceleration or an acceleration, or alternatively a branch or a joining of the running route.

As shown in FIG. 3A, the operation control codes 4 are located at suitable positions in the way of the running line 3.

On the other hand, the automated guided vehicle includes a sensor 5 such as a ultrasonic sensor or an optical sensor, for detecting the grooves 3a, 4a and 4b. For example, the ultrasonic sensor detects whether or not the groove 3a, 4a or 4b exists, by utilizing the principle of a ultrasonic distance measuring instrument, and the optical sensor detects whether or not the groove 3a, 4a or 4b exists, by utilizing the principle of an optical distance measuring instrument.

Specifically, as shown in FIG. 4A, the sensor 5 is mounted on the automated guided vehicle 1 to face to the floor surface 2, and to measure a distance between the sensor 5 and the floor surface 2, by measuring a time from emission of a ultrasonic wave or a light to arrival of a reflected ultrasonic wave or light. Since the distance between the sensor 5 and the floor surface 2 is different from the distance between the sensor 5 and the bottom of the groove, it is possible to detect whether or not the groove 3a, 4a or 4b exists. More specifically, since the distance between the sensor 5 and the floor surface 2 is at a constant, when this constant distance is detected by the sensor 5, it is decided that no groove exists. When the distance detected by the sensor 5 is longer than the constant distance, it is decided that a groove exists, and the sensor 5 outputs a groove detection signal. This detection manner can be applied not only when the groove 3a, 4a and 4b are constituted of the groove 6 having the bottom as shown in FIG. 4A, but also when the groove 3a, 4a and 4b are constituted of the bottomless groove or through-hole 7 as shown in FIG. 4B. In the latter case, the distance between the sensor 5 and a base surface 8 under the floor plate 2, is measured.

Figure 3B:
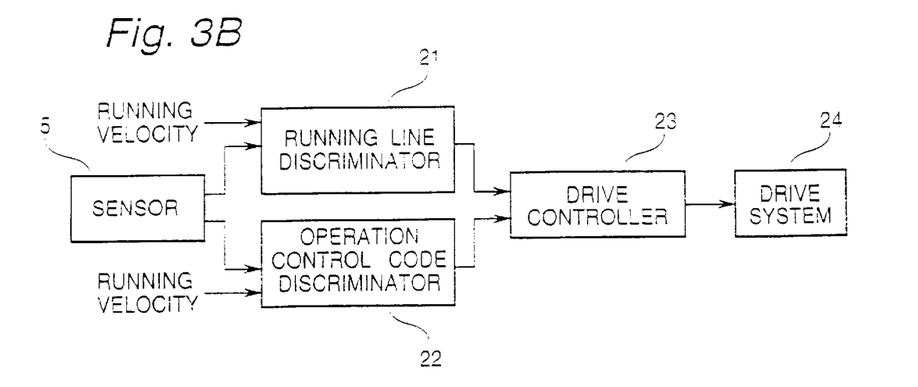
FIG. 3B is a block diagram of the control system incorporated in the automated guided vehicle shown in FIG. 3A.

Thus, the sensor 5 detects whether or not the groove 3a, 4a or 4b exists, and the automated guided vehicle 1 is automatically guided to follow or trace the array of the groove 3a, 4a and 4b. For this purpose, as shown in FIG. 3B, the automated guided vehicle 1 internally comprises a running line discriminator 21 receiving the groove detection signal from the sensor 5 and for discriminating the running line 3 to generate a running line discriminating signal, an operation control code discriminator 22 receiving the groove detection signal from the sensor 5 and for discriminating the operation control code 4 to generate an operation control code signal, and a drive controller 23 receiving the running line discriminating signal and the operation control code signal for driving and controlling a drive system 24 of the automated guided vehicle 1.

Specifically, the running line discriminator 21 and the operation control code discriminator 22 further receive a running velocity from a drive control system (not shown) in the automated guided vehicle 1 when the automated guided vehicle 1 is running, and discriminate the length of each detected groove on the basis of the running velocity of the automated guided vehicle and a duration of the groove detection signal supplied from the sensor. In this embodiment, when the grooves 3 having the constant length intermittently arranged as shown in FIG. 5A are discriminated, the running line discriminator 21 decides that the array of the detected grooves is the running line 3. On the other hand, when a regulated combination of the grooves 4a and 4b having the different lengths are discriminated, the operation control code discriminator 22 decide that the array of the detected grooves is the operation control code 4, and furthermore, discriminates what is the detected operation control code 4. These results of the discrimination in the running line discriminator 21 and the operation control code discriminator 22 are supplied to the drive controller 23, so that the drive controller 23 controls the drive system 24 of the automated guided vehicle 1. As a result, the automated guided vehicle 1 runs along the running line 3 and in accordance with the operation control code.

Now, an operation of the automated guided vehicle 1 will be described. The automated guided vehicle 1 shown in FIG. 3A runs along the running line 3 constituted of the grooves 3a in principle (but, constituted of the grooves 3a and the control code grooves 4a and 4b in the shown embodiment, namely, the control code grooves 4a and 4b constitute a portion of the running line 3 in the shown embodiment). In running, the automated guided vehicle 1 detects whether or not the groove 3a, 4a or 4b exists, and simultaneously, recognizes the length of each detected groove on the basis of the running velocity of the automated guided vehicle 1 and the duration of the groove detection signal. Thus, the automated guided vehicle 1 distinguishes the groove 3a for the running line 3 and the grooves 4a and 4b for the operation control code 4, from each other, and interprets the operation control code from the length of the grooves 4a and 4b for the operation control code 4, so that the automated guided vehicle 1 controls the running of the automated guided vehicle 1 in accordance with the interpreted operation control code.

In the above mentioned embodiment, since the running line 3 is constituted of the groove 3a, and the operation control code 4 is constituted of the grooves 4a and 4b, there is neither a convex nor a projection on the floor surface 2. Therefore, the structure of the floor surface can be simplified, and the running line 3 and the operation control code 4 are not influenced by a human being, a human-driven carrier, and the automated guided vehicle, and accordingly, a running trouble is hardly to occur. In addition, since the running line 3 and the operation control code 4 are constituted of grooves which are located in a single array, the reading sensor can be made common to the running line 3 and the operation control code 4, and therefore, the sensing system and the control signal can be simplified, with the result that reliability can be elevated, and the cost can be reduced.

Figure 6:
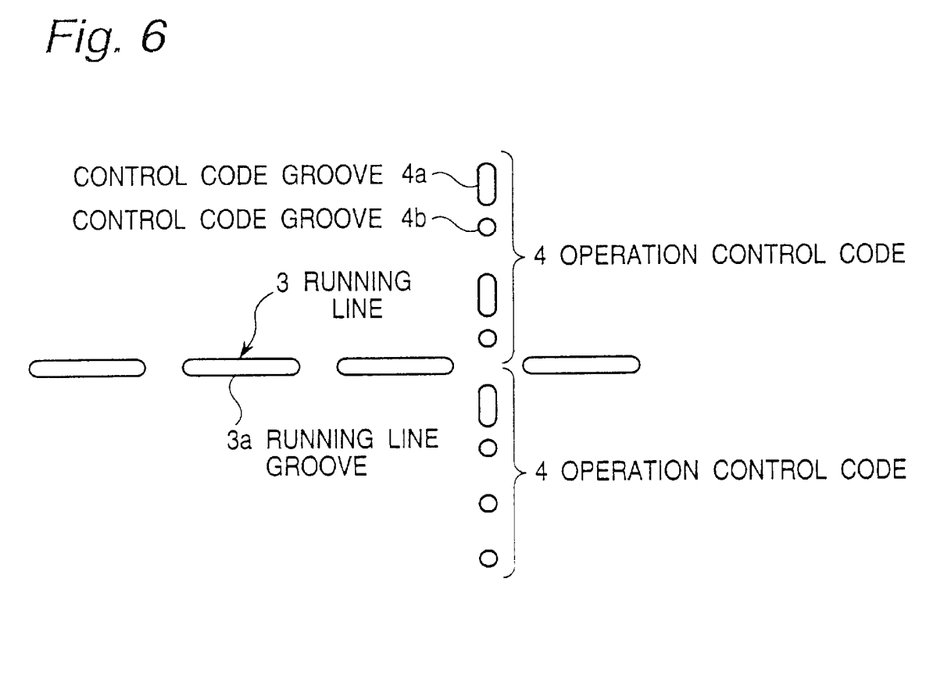
FIG. 6 illustrates another example of a combination of the grooves constituting the running line and the grooves constituting the operation control code, in the automated guided vehicle guidance system in accordance with the present invention.

In the above mentioned embodiment, the operation control codes 4 are located in parallel to the running line 3. However, as shown in FIG. 6, the grooves 4a and 4b constituting the operation control code 4 are located perpendicular to the groove 3a constituting the running line 3. In this case, the sensor is required to have a viewing field sufficient to detect the full width of the operation control codes 4. On the other hand, in order to discriminate the grooves 4a and 4b from each other, it is not necessary to receive the running velocity from the driving system from the automated guided vehicle. Therefore, the control system can be simplified.

The invention has thus been shown and described with reference to the specific embodiments. However, it should be noted that the present invention is in no way limited to the details of the illustrated structures but changes and modifications may be made within the scope of the appended claims.

I claim:

1. A guidance system for an automated guided vehicle which moves on a floor surface, comprising:

a running line composed of grooves of a predetermined length which are formed in said floor surface and which are arranged in a lengthwise direction to form a single array;

an operation control code composed of a combination of a plurality of grooves selected from groups having different lengths formed in said floor surface on said running line or in the proximity of said running line;

said automated guided vehicle comprising a sensor detecting said grooves for outputting a detection signal, a running line discriminating means receiving said detection signal for discriminating said running line to generate a running line discriminating signal, an operation control code discriminating means receiving said detection signal for discriminating said operation control code to generate an operation control code signal, and a drive control means receiving said running line discriminating signal and said operation control code signal for driving and controlling said automated guided vehicle.

2. A guidance system claimed in claim 1 wherein said operation control code discriminating means recognizes the length of each detected groove on the basis of a running velocity of said automated guided vehicle and a duration of said detection signal, and discriminates said operation control code on the basis of the arrangement order of said grooves having different lengths.

3. A guidance system claimed in claim 2 wherein said sensor is constituted of a ultrasonic sensor for detecting said groove by use of a ultrasonic wave.

4. A guidance system claimed in claim 2 wherein said sensor is constituted of an optical sensor for detecting said groove by use of a light.

5. A guidance system claimed in claim 1 wherein said sensor is constituted of a ultrasonic sensor for detecting said groove by use of a ultrasonic wave.

6. A guidance system claimed in claim 1 wherein said sensor is constituted of an optical sensor for detecting said groove by use of a light.

* * * * *